United States Patent [19]
Laflin et al.

[11] Patent Number: 5,380,015
[45] Date of Patent: Jan. 10, 1995

[54] MACHINED SHAFT SEAL ENCASED IN AN ELASTOMERIC SLEEVE

[75] Inventors: William O. Laflin, Grass Lake; Stanley N. Smith, Farmington, both of Mich.

[73] Assignee: Federal-Mogul Corporation, Southfield, Mich.

[21] Appl. No.: 169,446

[22] Filed: Dec. 17, 1993

[51] Int. Cl.6 .................................. F16J 15/32
[52] U.S. Cl. ............................ 277/37; 277/47; 277/152; 277/165; 277/227
[58] Field of Search ............ 277/35, 37, 39, 47, 277/50, 152, 165, 227, 181, 101, 189, 198

[56] References Cited

U.S. PATENT DOCUMENTS

| 2,635,907 | 4/1953 | Heimbuch | 277/227 |
| 2,857,184 | 10/1958 | Mancusi, Jr. | 286/26 |
| 3,057,630 | 10/1962 | Sneed | 277/165 |
| 3,331,611 | 7/1967 | Liebig | 277/227 |
| 3,362,719 | 1/1968 | McCormick | 227/37 |
| 3,400,411 | 9/1968 | Harvey | 277/227 |
| 3,443,845 | 5/1969 | Walchle et al. | 308/3.5 |
| 3,663,024 | 5/1972 | Traub | 277/165 |
| 3,775,832 | 12/1973 | Werra | 29/450 |
| 3,878,031 | 4/1975 | Dormer | 428/365 |
| 3,920,252 | 11/1975 | Dechavanne | 277/188 |
| 3,980,309 | 9/1976 | Dechavanne | 277/165 X |
| 4,038,359 | 7/1977 | Pendleton | 264/263 |
| 4,053,166 | 10/1977 | Domkowski | 277/152 |
| 4,101,140 | 7/1978 | Reid | 277/165 |
| 4,183,892 | 1/1980 | Corsi et al. | 264/263 |
| 4,526,383 | 7/1985 | Fuchs et al. | 277/152 |
| 4,911,454 | 3/1990 | Rapp et al. | 277/227 X |
| 5,039,112 | 8/1991 | Ulrich et al. | 277/35 |
| 5,183,271 | 2/1993 | Wada et al. | 277/227 X |
| 5,245,741 | 9/1993 | Smith et al. | 277/37 X |

FOREIGN PATENT DOCUMENTS

| 0347587 | 12/1989 | European Pat. Off. | 277/152 |
| 0460366 | 12/1991 | European Pat. Off. | 277/152 |
| 3234977 | 10/1991 | Japan | 277/152 |

Primary Examiner—William A. Cuchlinski, Jr.
Assistant Examiner—John L. Beres
Attorney, Agent, or Firm—Lawrence J. Shurupoff

[57] ABSTRACT

A manually assembled shaft seal assembly includes a plastic sealing element having an annular tubular mounting portion and a shaft-engaging sealing lip. An annular elastomeric sleeve extends around the inner and outer surfaces of the tubular mounting portion to provide a resilient mounting mechanism for the shaft seal assembly. During service at high operating temperatures, the elastomeric sleeve absorbs and accommodates stresses generated in the plastic tubular portion of the sealing element by thermal expansion. The elastomeric sleeve is in a compressed condition when mounted within a shaft seal housing so that it can expand slightly, if necessary, to compensate for shrinkage or creep in the plastic material, such that the seal assembly is prevented from becoming loose in the shaft seal housing.

7 Claims, 2 Drawing Sheets

MACHINED SHAFT SEAL ENCASED IN AN ELASTOMERIC SLEEVE

BACKGROUND OF THE INVENTION

1. Field of the Invention

This invention relates to a shaft seal which includes a sealing element formed of polytetrafluoroethylene or similar plastic material, and which is at least partially encased in an elastomeric sleeve for facilitating manual assembly of the seal and for improving the mounting and retention of the sealing element in the bore of a shaft seal housing.

2. Description of Prior Developments

The present invention has been primarily developed as an improvement of copending U.S. patent application Ser. No. 911,995, filed on Jul. 10, 1992. This prior application discloses a shaft seal that includes a one-piece annular seal element that has an annular mounting portion provided with an outer toothed surface insertable in a housing bore for retention of the seal element in the housing. An L-shaped sealing flange extends radially inwardly from the annular mounting portion for sealing contact with a rotary shaft extending through the shaft seal housing.

The seal element is typically formed of polytetrafluoroethylene ("PTFE") polymer, although other similar materials can also be used, e.g., urethane plastic, or a nitrile elastomer. The preferred material is PTFE because of its superior lubricity and low wear at elevated temperatures, and resistance to chemical attack by oils and other liquids.

However, PTFE has a relatively high coefficient of thermal expansion and a propensity to creep after prolonged exposure to thermal stress caused by elevated operating temperatures and the resulting applied pressure. Also, PTFE does not bond easily to metals or other materials. Additionally, the low coefficient of friction of PTFE makes it difficult to mount the material using a frictional clamping force. These factors make it difficult to securely mount and retain PTFE shaft seals in their casings as well as in their associated housing bores.

In the shaft seal disclosed in the above-mentioned U.S. patent application Ser. No. 911,995, the seal element is retained in the seal housing partly by a toothed surface on the seal element mounting portion and partly by the action of an annular metal band engaged with the inner annular surface of the seal element mounting portion. The metal band assumes a rigid configuration within the annular plastic mounting portion so that, when the seal assembly is forced into the seal housing bore, the plastic material is squeezed between the bore surface and the rigid metal band. The rigid metal band counteracts the tendency of the plastic material to shrink or creep after prolonged exposure to elevated temperature and pressure. Such creep or shrinkage, if unopposed, would allow the plastic seal element to become loosened in the housing bore and possibly fall out of the bore.

In the above-described seal element construction, the metal reinforcement band is retained on the inner surface of the plastic sealing element mounting portion by an annular plastic lip extending from the plastic sealing material radially inwardly along an edge of the band. The band is installed within the sealing element by moving the band axially across the lip and into the confined space on the inner surface of the seal mounting portion.

The rigidity of the plastic lip material is such that the operation of inserting the metal band into the sealing element must be performed with a press or similar machine. It would be desirable to be able to install the reinforcement band into the sealing element by a manual hand operation. However, hand insertion of the metal band into the plastic sealing element is typically not possible with the arrangement shown in the above-mentioned U.S. patent application Ser. No. 911,995.

Accordingly, a need exists for a shaft seal construction which allows easy hand installation of an elastomeric sleeve and a metal support band within a machined seal assembly of the type noted above.

SUMMARY OF THE INVENTION

The present invention has been developed to fulfill the needs noted above and relates to a shaft seal having a machined sealing element cut from PTFE or similar plastic material. The sealing element includes an annular tubular wall and a sealing flange extending radially inwardly from the tubular wall for slidable engagement with the surface of a rotating shaft. Surrounding the tubular wall is a hollow annular elastomeric sleeve having radially spaced inner and outer sections.

The outer surface of the outer section of the annular sleeve has a toothed configuration while the inner surface of the inner section has a smooth axially-extending surface that terminates in an inwardly-extending elastomeric lip. A steel reinforcement band may be easily manually inserted axially across the inwardly-extending lip to fit against the inner surface of the elastomeric sleeve.

Preferably, the steel reinforcement band is in pressure engagement with the elastomeric sleeve so that an inner section of the sleeve is slightly compressed between the band and the tubular wall of the plastic sealing element. Also, the toothed outer surface of the elastomeric sleeve is formed with a diameter larger than the housing bore in which the shaft seal is to be installed.

Therefore, when the seal assembly is installed into the housing bore, the tubular wall of the plastic sealing element will be in a radially squeezed and compressed condition between the inner and outer sections of the elastomeric sleeve. The steel band is rigid so as to restrain the inner section of the elastomeric sleeve against inward radial collapse.

During service, the elastomeric sleeve can deform slightly so as to accommodate or absorb thermal expansion of the plastic tubular wall of the sealing element. Also, the elastomeric sleeve can absorb any shrinkage or creep of the plastic material that may occur as a result of prolonged exposure of the sealing element to high operating temperatures and pressures.

The rigid metal band may be manually installed within the elastomeric sleeve by moving the band axially so as to deflect the elastomeric lip on the inner surface of the sleeve. The band rides along the deflected lip to a point where the lip snaps inwardly across the trailing edge of the band so that the band is mechanically locked within the sleeve by the inwardly protruding lip.

Since the elastomeric sleeve material is readily deformable, the process of inserting the steel band into the sleeve can be accomplished by a hand operation. A mechanical press is not required. This is advantageous in certain situations, e.g., for customized seal production where only a few shaft seal assemblies are to be manufactured or assembled at any one time.

DETAILED DESCRIPTION OF THE PREFERRED EMBODIMENTS

Figure 1:
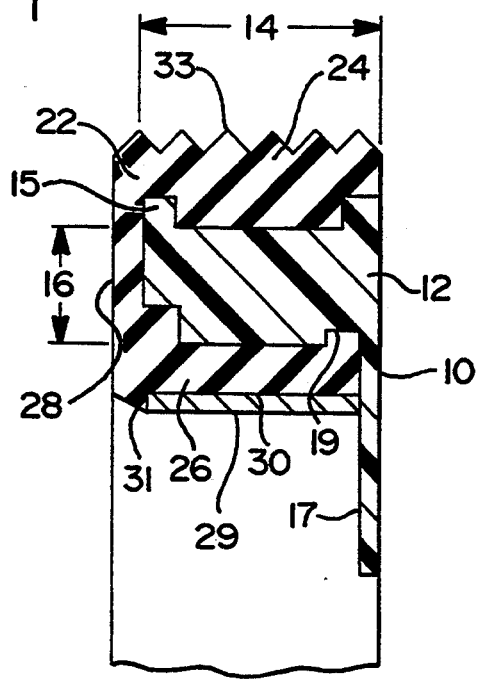
FIG. 1 is a fragmentary sectional view taken through a shaft seal embodying features of the invention.

FIG. 1 fragmentarily shows a shaft seal that includes a sealing element 10 preferably formed of PTFE. A preferred technique for forming sealing element 10 is to machine it in a lathe from a tubular billet of PTFE. The sealing element includes an annular body or tubular wall portion 12 having an axial dimension represented by numeral 14, and a radial dimension represented by numeral 16. In one example, dimension 14 may be about 0.3 inch and dimension 16 may be about 0.2 inch.

Figure 3:
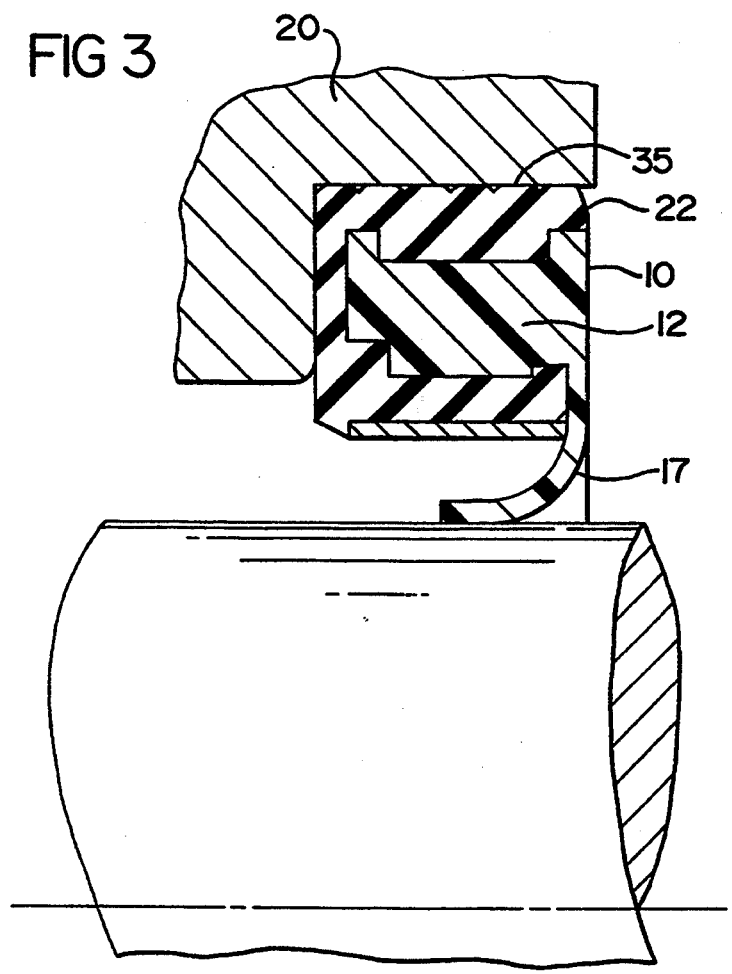
FIG. 3 is a fragmentary sectional view taken through the FIG. 1 shaft seal after installation thereof in a shaft seal housing.

A relatively thin sealing lip or radial flange 17 extends inwardly from tubular wall portion 12 toward the open center of the sealing element. FIG. 3 shows the shaft seal installed in a shaft seal housing 20 with a rotating shaft 25 extending through the central space circumscribed by the shaft seal. Sealing flange 17 has its free inner edge deflected by the shaft surface to provide a rotating seal at the flange-shaft interface. The zone to the left of flange 17 will ordinarily contain oil or similar lubricant. The zone to the right of flange 17 will ordinarily be air at atmospheric pressure.

Referring to FIG. 1, an annular elastomeric sleeve 22 encircles the tubular wall portion 12 to form a resilient mounting surface for the shaft seal assembly. Sleeve 22 includes an outer resilient sleeve section 24 extending axially along the outer surface of tubular wall portion 12, an inner resilient sleeve section 26 extending axially along the inner surface of tubular wall portion 12, and an annular connecting section 28 radially bridging the outer and inner sleeve sections.

The cross sectional configuration depicted in FIG. 1 is continued around the entire circumference of the shaft seal assembly, i.e. the cross sectional configuration is substantially the same in all radial planes taken through the seal central axis.

Plastic sealing element 10 and elastomeric sleeve 22 are formed separately and are connected together mechanically by moving the elastomeric sleeve in a left-to-right direction to the illustrated position, wherein the sleeve encircles the tubular wall portion 12. In order to securely retain the elastomeric sleeve on wall portion 12, an outwardly-extending annular rib or tongue 15 is formed on wall portion 12 and a mating groove is formed in the internal surface of the elastomeric sleeve. When the sleeve is fully inserted onto the tubular wall portion 12, the groove interlocks with rib 15 to prevent the elastomeric sleeve from axially separating from wall portion 12.

As an optional feature, tubular wall portion 12 can also be formed with an annular groove 19 on its inner surface 21. When elastomeric sleeve 22 is fully inserted onto tubular wall portion 12, groove 19 interlocks with the elastomeric sleeve material to lock the sleeve to tubular wall portion 12. The operation of inserting sleeve 22 onto tubular wall 12 can be performed by hand. No mechanical assembling equipment is required so that this seal construction is ideally suited to low volume production of made-to-order, customized, hand-assembled shaft seals.

In order to reinforce the inner elastomeric sleeve section 26 against radial collapse, there is provided a steel band 29 extending along the sleeve inner surface 30 in radial registry with tubular sleeve 12. In one example, band 29 will have an axial length of about 0.25 inch and a wall thickness of about 0.03 inch. In its free state, band 29 is readily deformable or distortable. However, when the band is installed within the elastomeric sleeve, it becomes a rigid annular radial reinforcement member for the elastomeric sleeve material as well as for the tubular wall portion 12 of the sealing element 10.

Figure 2:
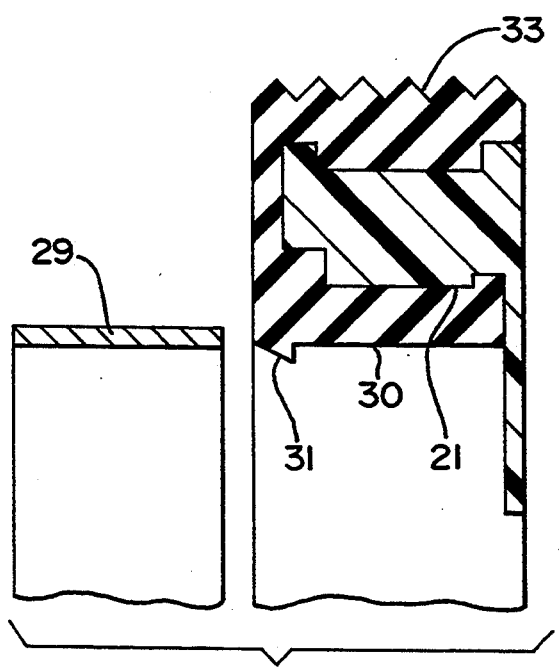
FIG. 2 is a view taken in the same direction as FIG. 1, but with the reinforcement band separated from the remaining shaft seal components.

Elastomeric sleeve 22 is formed so that its inner surface 30 has a diameter slightly smaller than the outside diameter of steel band 29. As shown in FIG. 2, the outer surface of band 29 radially projects slightly above the plane of sleeve surface 30 as the band outer diameter is greater than the diameter of sleeve surface 30. Band 29 can be easily inserted by hand into the space circumscribed by elastomeric sleeve 12, such that the band has the position shown in FIG. 1. Again, this type of easy manual assembly is ideally suited for low volume, customized seal manufacture.

An annular lip 31 is preferably formed on sleeve section 26 to retain the steel band against axial escape from the FIG. 1 position. Lip 31 is sufficiently resilient and easily deformable so as not to pose an obstacle to hand insertion of the band into the elastomeric sleeve. Without the presence of inner sleeve section 26, a plastic retaining lip would have to be formed on the inner surface 21 of wall portion 12. Such a rigid plastic lip would be difficult to deform and likely prevent hand insertion of the band 29 within the wall portion 12.

Because of the diameter differences between band 29 and sleeve surface 30, the band will exert an outward radial force on the elastomeric sleeve surface when the band is in its installed position. The inner sleeve section 26 will be slightly resiliently compressed between band 26 and tubular wall portion 12.

The outer sleeve section 24 of elastomeric sleeve 22 has an outer surface that is grooved at axially-spaced points so as to form a series of resilient deformable teeth 33. The outer diameter of elastomeric sleeve 22, measured across the tips of teeth 33, is slightly greater than the diameter of housing bore 35 (FIG. 3). When the FIG. 1 seal assembly is inserted into bore 35, the resilient teeth 33 will be deformed to a compressed condition.

In the installed position of the shaft seal assembly (FIG. 3), both the outer sleeve section 24 and the inner sleeve section 26 of annular sleeve 22 are in compressed conditions. This is advantageous in that the resilient sleeve material can respond to long-term shrinkage and creep of plastic tubular wall portion 12 without allowing the shaft seal assembly to become loosened in the housing bore 35. The resilience of the sleeve 22 material is also beneficial in that the elastomeric material can deform to accommodate thermal expansion of the plastic material, thereby relieving thermal stresses that might otherwise be generated in the plastic material.

Figure 4:
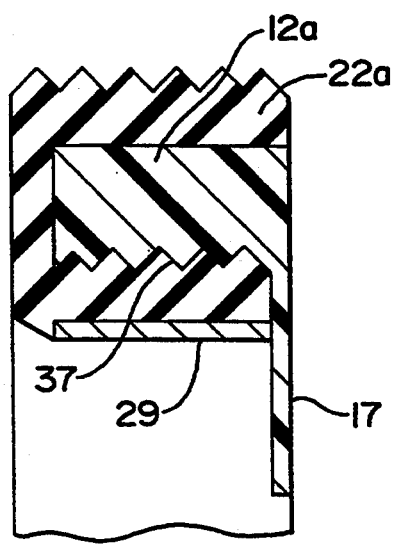
FIG. 4 is a fragmentary sectional view showing a second embodiment of the invention.

FIG. 1 illustrates a preferred form of the invention. The invention can be practiced in other forms as shown, for example, in FIGS. 4 and 5. In the FIG. 4 arrangement, the inner surface of plastic tubular wall portion 12a is grooved at axially-spaced points so as to form a plurality of triangular cross-sectioned ribs 37. Elastomeric sleeve 22a is formed with a corresponding number of complimentary-shaped grooves.

When sleeve 22a is inserted onto tubular wall portion 12a, the ribs and grooves interlock to prevent axial separation of the elastomeric sleeve from the tubular wall portion. The overall size and shape of the FIG. 4 shaft seal assembly is the same as that of the FIG. 1 assembly. When the FIG. 4 shaft seal assembly is inserted into a housing bore, it will function in approximately the same manner as the shaft seal assembly of FIG. 1.

Figure 5:
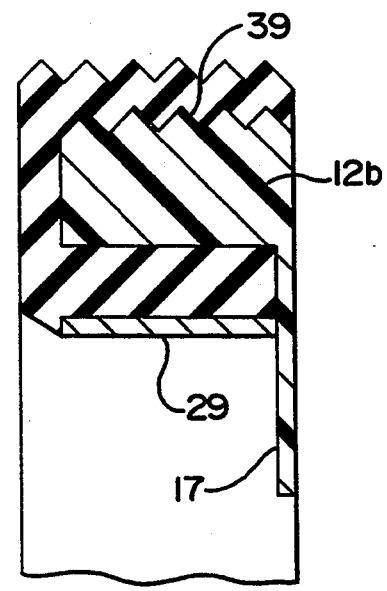
FIG. 5 is a sectional view taken in the same direction as FIG. 4, but illustrating a third embodiment of the invention.

FIG. 5 shows an alternate construction wherein the plastic tubular wall portion 12b is grooved on its outer surface to form a series of triangular cross-sectioned ribs 39. The elastomeric sleeve assembly is formed with a series of grooves complimentary to ribs 39 so that the sleeve is prevented from axial displacement from the tubular wall portion 12b. During service, the FIG. 5 shaft seal assembly functions in essentially the same fashion as the shaft seal assemblies shown in FIGS. 1 and 4.

In the various illustrated forms of the invention, the elastomeric sleeve acts as an encasement for the plastic tubular wall portion so that, in the installed condition of the shaft seal assembly, the plastic tubular wall portion is reinforced and confined by the surrounding elastomer and associated steel band 29. The presence of the elastomeric sleeve around the plastic tubular wall is advantageous in that the tubular wall can have a relatively small radial dimension 16 (FIG. 1), with a correspondingly small mass of plastic material subject to thermal expansion and long term shrinkage.

The drawings necessarily show particular forms of the invention. However, it will be appreciated that the invention can be practiced in other forms and configurations.

What is claimed is:

1. A shaft seal, comprising:
an annular sealing element formed of a plastic material, said annular sealing element comprising a tubular wall portion and a sealing lip extending radially inwardly from said tubular wall portion, said tubular wall portion having an inner surface and an outer surface;
an annular elastomeric sleeve encircling said tubular wall portion, said sleeve comprising an outer sleeve section extending along the outer surface of the tubular wall portion, and an inner sleeve section extending along the inner surface of the tubular wall portion; and
an annular rigid reinforcement band extending along the inner sleeve section in radial alignment with said tubular wall portion, said band being engaged with said inner sleeve section so that said inner sleeve section is compressed between said band and said tubular wall portion, said outer sleeve section of the elastomeric sleeve being oversized with respect to a housing bore in which the shaft seal is to be mounted, whereby said outer sleeve section is compressed between said tubular wall portion and the housing bore when the shaft seal is installed in the bore.

2. The shaft seal of claim 1, wherein said elastomeric sleeve further comprises an annular connecting section bridging the annular space between the outer sleeve section and the inner sleeve section.

3. The shaft seal of claim 2, wherein said tubular wall portion and said elastomeric sleeve have annular interlocking means thereon for preventing axial separation of the sleeve and tubular wall portion when the shaft seal is installed in the housing bore.

4. The shaft seal of claim 3, and further comprising an annular lip extending radially inward from the inner sleeve section of said elastomeric lip to prevent axial separation of the reinforcement band from the elastomeric sleeve.

5. The shaft seal of claim 3, wherein the outer sleeve section of said elastomeric sleeve has an outer toothed surface, said toothed surface comprising a plurality of annular deformable teeth adapted to be compressively deformed within the housing bore when the shaft seal is installed in the bore.

6. The shaft seal of claim 2, wherein said tubular wall portion has at least one annular rib extending outwardly therefrom, said elastomeric sleeve having at least one annular groove in its outer sleeve section, said groove being mated to said rib to prevent the elastomeric sleeve from axial separation from of said tubular wall portion.

7. The shaft seal of claim 2, wherein said annular sealing element is formed of polytetrafluoroethylene and said annular elastomeric sleeve is of one-piece construction.

* * * * *